Jan. 5, 1943.　　　　G. R. ERICSON　　　　2,307,366

WINDSHIELD WIPER ARM CONTROL

Filed Nov. 3, 1941

INVENTOR
GEORGE R. ERICSON

ATTORNEY

Patented Jan. 5, 1943

2,307,366

UNITED STATES PATENT OFFICE 2,307,366

WINDSHIELD WIPER ARM CONTROL

George R. Ericson, Kirkwood, Mo., assignor to Carter Carburetor Corporation, St. Louis, Mo., a corporation of Delaware Application November 3, 1941, Serial No. 417,723

12 Claims. (Cl. 15—255)

This invention relates to windshield cleaners of the automatic type. In cleaners of the power operated type, whether electric or the air pressure or so called suction operated type, the method of obtaining the most effective wiping control of the wiper element on the windshield glass, as heretofore practiced, have not been satisfactory.

Various attempts have been made to provide a clean, wiping action, such as by providing a resiliency in the wiper arm, or by spring means for applying excessive pressure on the wiper blade in the hope of obtaining a cleaner wiping action. Attempts have been made to provide a cleaner wiping action by changing the position of the wiper blade whereby a sweeping action is obtained. In all of the attempts the wiper blade travels the same course back and forth across the windshield.

During the initial performance of a windshield cleaner, the wiper blade functions very efficiently but by reason of excessive pressure, the wiper blades, which usually embody a flexible rubber strip projecting from a rigid backing or holder, becomes distorted and deformed in that the flexible rubber strip will eventually become bent and set through oxidization whereby the same will not flex and flap back and forth as the wiper is reciprocated. Consequently, the wiping efficiency of the blade will, obviously, be impaired. The contacting edge of the blade often becomes corrugated and when reciprocated back and forth across the windshield, streaks are formed and left on the windshield which greatly reduces the visibility therethrough.

The present invention has for its object an automatic shifting device whereby the wiper blade does not traverse the same path across the windshield but is constantly changing so that a streak left during one cycle is cleaned away during the next cycle of the windshield wiper blade; to provide means for changing the position of the pivot of the wiper arm automatically, and to provide means for adjusting the pressure exerted upon the wiper blade.

The invention further resides in the features of construction and their arrangements and combinations of parts hereinafter described in detail and set forth in the claims, reference being had to the accompanying drawing wherein:

Figure 1:
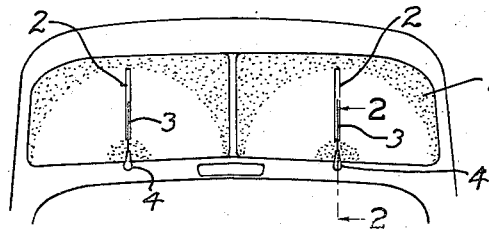
Fig. 1 is a front elevation of the device mounted on an automobile windshield.

Wipers in general use are of the type that clean in a semi-circular path across the windshield and are actuated through a fixed arc about a fixed pivot. The wiper arm is generally secured to a driven shaft which extends through the automobile cowling substantially at right angles to the windshield so that the wiper arm will exert an equal pressure on the wiper blade throughout its stroke.

The windshield is indicated at 1 and is contacted by the wiper blade 2 which is actuated by the wiper arm 3 pivoted at 4.

A means of shifting the pivot point of the wiper arm so that the wiper blade will continually change its path across the windshield may be better understood by referring to the Figs. 2, 3, 4 and 5 in which a rock shaft 10 is reciprocated in bearing 11, by either an electric or a fluid pressure motor (not shown). An actuating arm 12 for transmitting radial motion to the wiper arm is secured to shaft 10 by a set screw 13 and may be adjusted longitudinally along the shaft for regulating the contacting pressure of the wiper blade against the windshield. Actuating arm 12 extending upwardly and outwardly is provided with a hook 14 for slidably receiving wiper arm 3.

Figure 5:
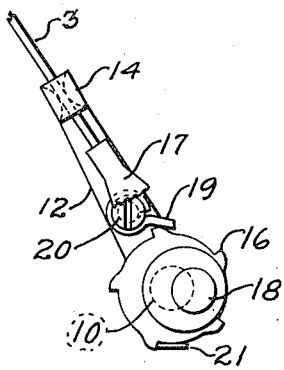

An eccentric element 15 pivoted on the end of shaft 10 is provided with ratchet teeth 16 concentric with the shaft 10. On the end of wiper arm 2, a head 17 is formed for receiving and pivoting on a boss 18 projecting from element 15. Boss 18, eccentrically positioned relative to shaft 10, changes position as element 15 is rotated by a dog 19 which is pivoted on a screw 20 threadedly secured to arm 12. Dog 19 engages ratchet teeth 16 and rotates the element 15 clockwise until the end of the wiper stroke is reached whereupon a spring element 21 secured to bearing 11 engages teeth 16 thereby holding element 15 against counterclockwise rotation while the wiper arm moves counterclockwise in making its return stroke as illustrated in Fig. 5.

Figure 3:
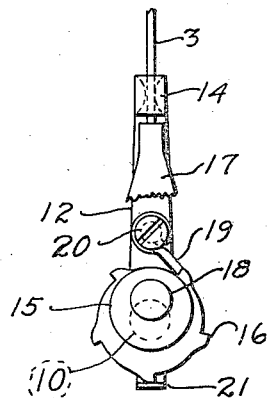
Fig. 3 is a front elevation of the device with portions broken away.
Figure 2:
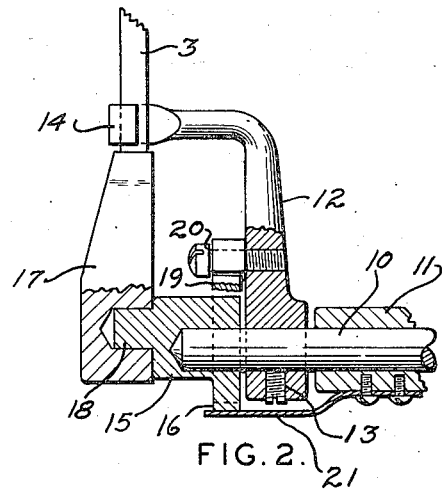
Fig. 2 is a sectional view of the device taken substantially on line 2—2 in Fig. 1.
Figure 4:
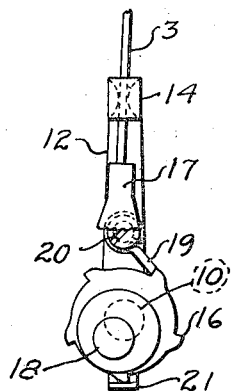
Figs. 4 and 5 are views similar to Fig. 3 but show the device in other operative positions.

Fig. 3 shows the boss 18 in its uppermost position whereby the wiper arm is extended while in Fig. 4 the boss is in its lower position with the wiper arm retracted. The position of boss 18 is changed during each clockwise stroke of the wiper and positioning of boss 18 may be governed by the number and spacing of teeth 16, Hook 14 on the end of actuating arm 12 is so constructed that the wiper arm head 17 may be placed over boss 18 and the wiper arm 2 slipped under the hook 14 thereby securely holding element 15 in place while exerting the correct wiping pressure on the wiper arm.

Various features of the invention may be modified as will occur to those skilled in the art and the exclusive use of such modifications as come within the scope of the appended claims is contemplated.

I claim:

1. A windshield wiper having in combination, a wiper arm pivotally mounted for wiping movement, a rock shaft movable about a fixed axis, means actuated by said rock shaft for operating said wiper arm, and means automatically shifting the pivot of the wiper arm in an orbit about the axis of the rocker arm.

2. A windshield wiper having in combination, a wiper arm pivoted at one end, a rock shaft for actuating said wiper radially and means carried by said shaft for progressively shifting said wiper arm eccentrically relative to said shaft as said wiper arm is actuated.

3. In a windshield wiper, a wiper arm, a rock shaft for actuating said wiper arm, an element adapted to revolve about said shaft, one end of said wiper arm being pivoted on said element eccentrically relative to said shaft and means for progressively revolving said element as said wiper arm is actuated.

4. In a windshield wiper, a wiper arm, a rock shaft for actuating said wiper arm, an element adapted to revolve on said shaft, one end of said wiper arm being pivoted on said element eccentrically relative to said shaft and means for revolving said element progressively by the actuation of said wiper arm.

5. In a windshield wiper comprising a wiper arm, a rock shaft for actuating said wiper arm back and forth across a windshield, an element adapted to revolve on said shaft, one end of said wiper arm being pivoted on said element eccentrically relative to said shaft and means carried by said shaft for progressively revolving said element whereby the pivot of said wiper arm is substantially changed during the actuation of said wiper arm.

6. In a windshield wiper, a wiper arm, a rock shaft, an element pivoted on said shaft, said wiper arm having one end pivoted on said element eccentrically relative to said shaft, an arm secured to said rock shaft, said arm having a portion adapted to slidably receive said wiper arm and means carried by said arm for progressively revolving said element as said shaft is rocked whereby the pivot of said wiper arm is progressively changed.

7. In a windshield wiper, a rock shaft, an element pivoted on said shaft, a wiper arm for traversing a portion of said windshield, said wiper arm being pivoted on said element eccentrically relative to said shaft, an arm secured to said shaft for transmitting radial motion to said wiper arm and means carried by said arm for revolving said element whereby said wiper arm is progressively shifted longitudinally as said shaft is rocked.

8. In a windshield wiper, a rock shaft, an eccentric pivoted on said shaft, a wiper arm having one end pivoted on said eccentric, the other end supporting a wiper blade, an arm secured to said shaft for transmitting radial motion to said wiper arm, and means carried by said arm for revolving said eccentric whereby said wiper arm is progressively shifted longitudinally as said shaft is rocked in one direction.

9. A windshield wiper having in combination, a rock shaft, an eccentric pivoted on said shaft, a wiper arm pivoted on said eccentric, a wiper blade carried by said wiper arm for contacting a windshield, an arm on said shaft for slidably receiving and transmitting radial motion to said wiper arm, means carried by said arm for revolving said eccentric, as said shaft is rocked, and said arm being adjustable longitudinally along said shaft whereby the desired contacting pressure may be applied to said wiper blade.

10. In a windshield wiper, a rock shaft, a pivoted wiper arm adapted to traverse a portion of a windshield, an eccentric between said wiper arm and said rock shaft, an arm on said shaft adapted to transmit radial motion to said wiper arm and means for revolving said eccentric in one direction as said shaft is rocked.

11. In a windshield wiper, a rock shaft, a pivoted wiper arm, an eccentric pivoted between said shaft and said wiper arm, an arm on said shaft adapted to transmit radial motion to said wiper arm, means for revolving said eccentric during radial movement of said wiper arm, and said arm being constructed and arranged to hold said wiper and said eccentric in operative association with said shaft.

12. A windshield wiper having in combination, a wiper arm mounted on a shiftable pivot for wiping movement, a rock shaft movable about a fixed axis, means actuated by the rock shaft for operating said wiper arm, and means for shifting the pivot of the wiper arm during the movement of the rock shaft to vary the surface area engaged by the wiper.

GEORGE R. ERICSON.